United States Patent [19]

Oikawa

[11] 4,127,399
[45] Nov. 28, 1978

[54] METHOD OF MAKING GRANULATED SLAG

[75] Inventor: Nisaburo Oikawa, Kodaira, Japan

[73] Assignee: Rasa Shoji K.K., Tokyo, Japan

[21] Appl. No.: 828,859

[22] Filed: Aug. 29, 1977

Related U.S. Application Data

[63] Continuation-in-part of Ser. No. 703,755, Jul. 9, 1976, abandoned.

[30] Foreign Application Priority Data

Jul. 25, 1975 [JP] Japan ............................. 50-91364

[51] Int. Cl.$^2$ ............................................. C03B 37/00
[52] U.S. Cl. ........................................ 65/19; 65/141; 75/24; 75/30; 210/73 R; 210/298; 210/311
[58] Field of Search ................ 65/19, 20, 141; 75/24, 75/30; 210/73, 298, 311

[56] References Cited

U.S. PATENT DOCUMENTS

| 2,471,559 | 5/1949 | Dolezal | 65/141 |
| 2,918,697 | 12/1959 | Hardgrove | 65/141 |
| 3,615,329 | 10/1971 | Jones | 65/141 |
| 3,645,708 | 2/1972 | Grady | 65/141 X |

Primary Examiner—Robert L. Lindsay, Jr.
Attorney, Agent, or Firm—Hans Berman

[57] ABSTRACT

The hot mixture of solid slag particles and water produced by contacting water with the molten slag released from a blast furnace is introduced into a tank equipped with an overflow and a filter at the overflow which permits a portion of the water and a minor fraction of slag fines to overflow. The major fraction of larger slag particles collects at the bottom of the tank and is pumped as a slurry containing the remainder of the heated water to a remote sedimentation zone where the slag particles and the water of the slurry are separated.

7 Claims, 3 Drawing Figures

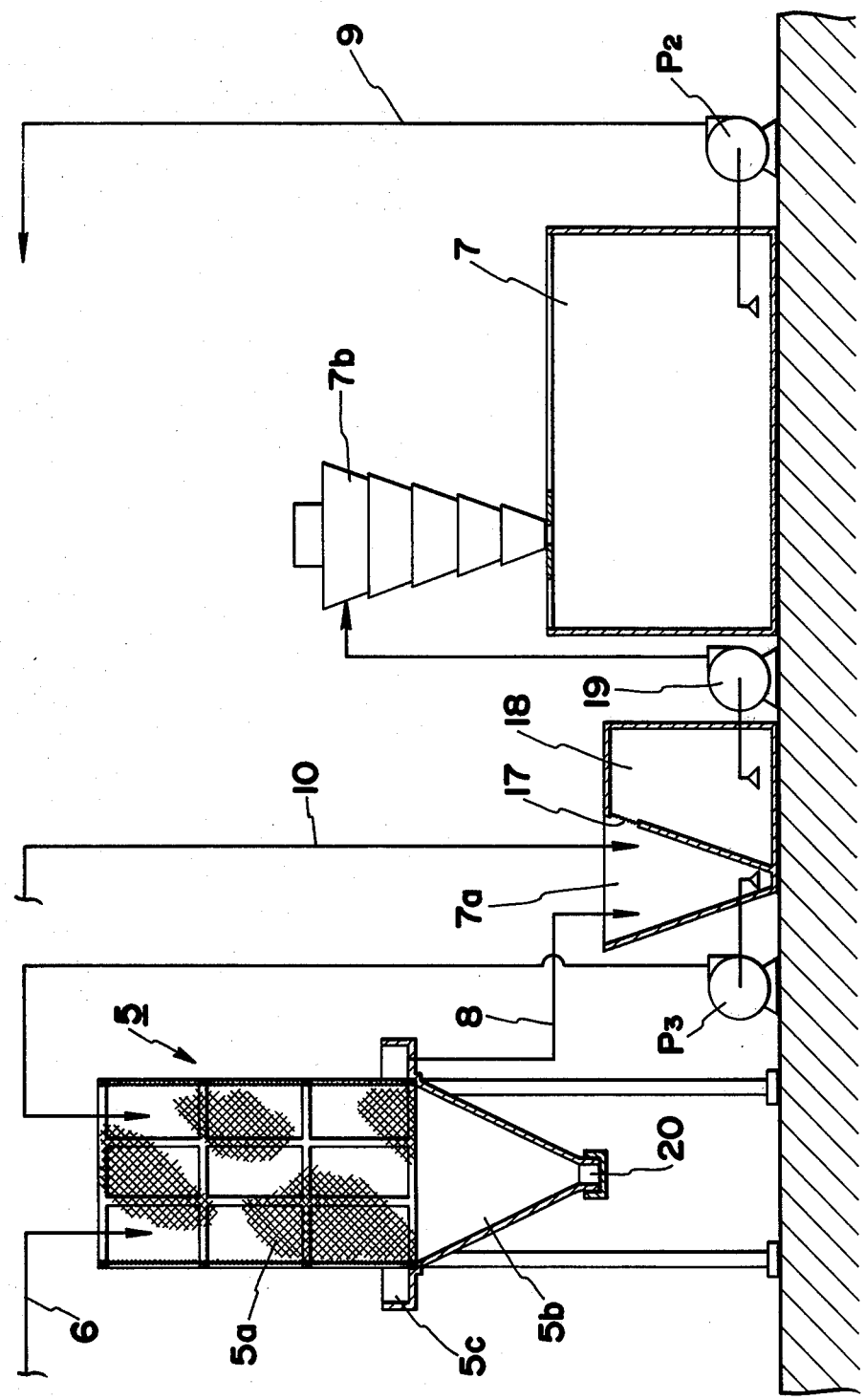

METHOD OF MAKING GRANULATED SLAG

This application is a continuation-in-part of the copending application Ser. No. 703,755, filed July 9, 1976, and now abandoned.

This invention relates to the manufacture of granulated slag by quenching of molten slag with water, and particularly to an improved method of working up the mixture of slag particles and water which results from the quenching.

The method of the invention will be described hereinafter in its application to the so-called "jet process" in which a stream of molten slag discharged from a blast furnace or similar source is broken up by a high-pressure water jet as it falls into a pit or other container, and the slag granulated thereby falls into the water in the pit to be quenched further. The resulting mixture of slag particles and water needs to be separated, and the preferred separation method is sedimentation requiring relatively voluminous tanks for which space is not available near the furnace. It was common practice prior to this invention to convey the entire aqueous slag mixture from the quenching container to a remote sedimentation zone by means of a pump capable of withstanding the abrasive effect of the solids in the mixture.

Suitable slurry pumps are relatively expensive, and their first cost, their operating expense, and the cost of maintaining them increases sharply with their size. Pipe lines capable of withstanding the abrasive action of the pumped slurry are correspondingly expensive. It is a primary object of this invention to convey slag particles from their source to a remote sedimentation zone for separation from quenching water at a lower cost than is possible in the conventional arrangement.

With this and other objects in view, the invention provides a method of making granulated slag in which water is contacted with molten slag in an amount sufficient to cause breaking of the molten slag into solid particles, whereby the water is heated. The particles and the heated water are introduced into a container equipped with an overflow upwardly spaced from the bottom wall of the container, whereby at least a major portion of the particles collects near the bottom wall. Enough heated water is introduced into the container to cause a portion thereof to be released through the overflow, and the remainder of the heated water and the collected particles are pumped as a slurry out of the container to a remote sedimentation zone where they are separated from each other.

Other features, additional objects, and many of the attendant advantages of this invention will readily be appreciated as the same becomes better understood from the following detailed description of a preferred embodiment when considered in connection with the appended drawing in which:

FIG. 3 illustrates the sedimentation devices of the apparatus of FIG. 1 in elevation and partly in section, but rearranged for simpler pictorial representation.

Figure 1:
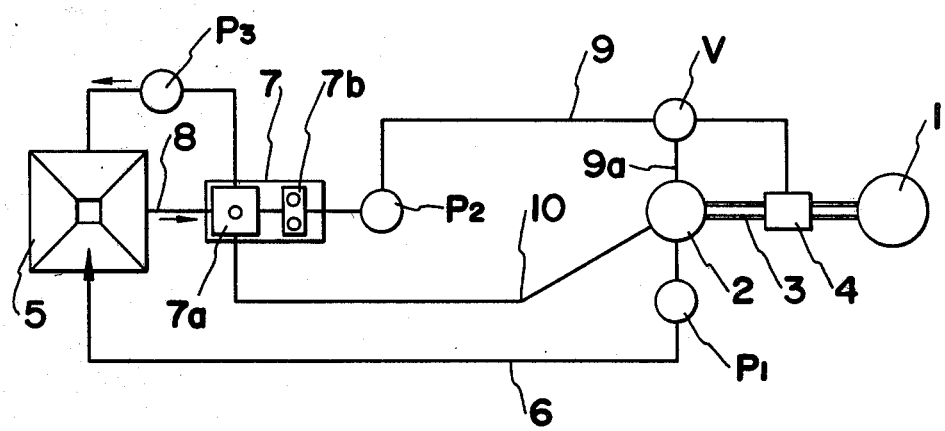
FIG. 1 illustrates apparatus for performing the method of the invention in simplified top plan view.

Referring initially to FIG. 1, there is indicated a blast furnace 1 from which a chute 3 leads obliquely downward into a quenching tank 2. An array of water jets 4 conventional, and not illustrated in detail, is directed toward the material in the chute 3. The conically tapering bottom portion of the tank 2 is connected to a remote primary sedimentation tank 5 by a pipe line 6 equipped with a main slurry pump $P_1$. An overflow line 10 leads from the tank 2 downward to a secondary sedimentation tank 7a which also receives supernatant liquid from the primary sedimentation tank 5 through a pipe 8 by gravity. The sediment formed in the tank 7a is returned to the primary sedimentation tank 5 by an auxiliary slurry pump $P_3$ while water substantially free from solid matter is conveyed from the secondary sedimentation tank 7a to a cooling tower 7b. The cooled water is collected in a reservoir 7 where it is also replenished for evaporation and drag-out losses in a manner not specifically illustrated, and from where it is pumped to the water jets 4 by a pump $P_2$ through line 9. A distributor valve V permits a portion of the water to be diverted directly into the quenching tank 2 through a branch line 9a.

Figure 2:
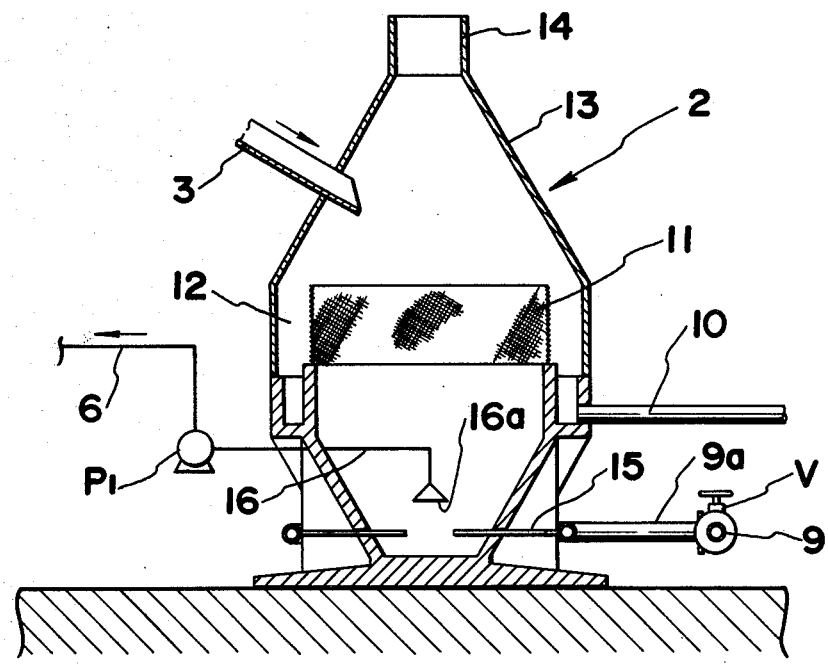
FIG. 2 shows the quenching container and associated elements of the apparatus of FIG. 1 in elevational section.

As is shown in greater detail in FIG. 2, the quenching tank 2 is covered by a hood 13 from which steam is conducted into a stack 14, only partly shown. The rim about the open top of the tank carries an upright, cylindrical wire screen 11 whose openings have an approximate size of 5 mm. An annular trough 12 extends about the rim of the tank to catch liquid passing through the screen 11 and to lead the liquid into the overflow line 10.

The branch line 9a includes an annular distributor section about the conically tapering bottom part of the tank 2. Radial injection nozzles 15 extend from the distributor section into the tank 2 and terminate near the bottom wall of the tank. The intake line 16 of the main slurry pump $P_1$ enters the bottom portion of the tank 2 and has an enlarged orifice 16a directed downward toward the bottom wall of the tank and the nozzles 15.

During operation of the equipment described so far, the mixture of slag particles and boiling hot water dropped from the chute 3 into the tank 2 is mixed with enough water discharged at approximately 40° C. from the nozzles 15 to reduce the temperature of the pumped slurry to about 70° C., and thereby to prevent cavitation in the slurry pump $P_1$. The combined rate at which water enters the tank 2 from the chute 3 and the nozzles 15 is controlled by means of the valve V to exceed the capacity of the slurry pump $P_1$. The water level in the tank 2 thus rises above the tank rim and water flows through the screen 11. When the tank is first operated, the overflowing water carries slag particles with it. However, the size of the coarsest slag particles is approximately 7 mm, and a filter cake impervious to all but the smallest slag particles, but readily permeable to water is built up on the inner surface of the screen 11. Only a minor fraction of the solids entering the tank 2, much less than 10%, leaves the tank through the screen 11, and does not interfere with gravity flow of the water from the trough 12 through the line 10.

The water injected into the tank 2 through the nozzles 15 not only reduces the water temperature in the tank 2, but also stirs the contents of the tank to prevent a solid cake of slag particles to be formed in the tank bottom, and maintains a uniform distribution of solids in the slurry pumped from the tank. Because the intake orifice 16a is located near the bottom wall of the tank and the injection nozzles 15, solid slag particles generally move downward through the tank 2 while there is very little corresponding movement of water. Most of the hot water entering the tank 2 with the freshly granulated slag is discharged into the overflow trough 12 at almost 100° C. in a continuous stream and replaced in the pumped slurry by the cooler injected water.

The devices in which the major portion of solid slag particles is separated from the water in the pumped slurry, and the minor fraction of fines is recovered from the water overflowing from the tank 2 is shown in greater detail in FIG. 3.

The primary sedimentation tank 5 has an upright cylindrical top portion 5a made of wire screen and a coaxial, conical bottom portion or hopper 5b whose top rim supports the screen portion 5a and an annular overflow trough 5c about the lowermost part of the screen portion. The pipe 8 leads downward from the trough 5c into the open, wide top of the conical secondary sedimentation tank 7a which also receives the discharge end of the overflow line 10. The intake pipe of the auxiliary slurry pump P₃ has its orifice near the bottom end of the tank 7a, and its discharge pipe terminates in the top of the primary sedimentation tank 5. A screened overflow opening 17 near the top of the tank 7a leads into a storage compartment 18 from which water may be transferred to the top of the cooling tower 7b by a pump 19. the cooling tower is mounted atop the reservoir 7 from which the pump P₂ draws water into the lines 9 and 9a. Fresh water may be added to the contents of the reservoir 7 as not specifically illustrated. A cap 20 is removed from time to time from the bottom of the hopper section 5b to empty the same of granulated slag carrying but a minimal amount of water. The water conveyed by the pump P₂ is virtually free of suspended solids.

The coarse particles in the slurry entering the tank 5 through the pipe line 6 drop into the hopper 5b. A cake building up on the inner face of the screen portion 5a in the manner described with reference to the screen 11 also retains finer particles which ultimately settle in the hopper 5b. A small amount of fines is collected on the bottom of the secondary sedimentation tank 7a together with fines out of the hot water overflowing from the quenching tank 2 and is transferred to the primary sedimentation tank by the small auxiliary slurry pump P₃. The supernatant water from the secondary sedimentation tank 7a, after being further filtered through the screen in the opening 17 and any cake that may build up on the screen, is cooled to about 40° C. in the tower 7b for return from the reservoir 7 to the quenching tank 2 by the pump P₂.

The overflow arrangement on the quenching tank 2 does not significantly increase the space required by the tank. Yet, the transfer of a substantial portion of the process water from the tank 2 to the remote sedimentation zone by gravity through the overflow line 10 materially decreases the burden on the primary slurry pump P₁. The method of the invention thus may be performed with a slurry pump and associated equipment of smaller capacity, and thus at lower cost than an otherwise comparable conventional method of making granulated slag. The overflow arrangement, in cooperation with the nozzles 15, maintains a practically uniform liquid level in the quenching tank 2, virtually independent of variations in the rate of slag delivery into the tank. The power demand of the pump P₁ is thereby held near a constant value, and the driving electric motor, not illustrated, may be chosen accordingly to operate at highest efficiency. A practically uniform flow rate is maintained readily in the pipe line 6 even at varying rates of slag delivery to the quenching tank so that clogging of the line by settling slag particles is avoided or minimized.

A conventional plant for producing granulated slag by the jet process was modified by installing a screened overflow on its quenching tank substantially as shown in FIG. 2 so that the water supplied by the jets 4 and the nozzles 15 was partly removed by gravity. The solids content of the slurry pumped from the bottom of the quenching tank under a wide range of operating conditions was determined both before and after the modification. It ranged from 8.41% ro 13.37% by volume prior to the modification, and from 17.64% to 26.47% after the modification, indicating that approximately one half of the total water entering the quenching tank and more than one half of the hot water introduced with the granulated slag was removed before it reached the main slurry pump. There was still enough water left in the slurry for pumping, but the dwell time of the slurry in the primary sedimentation tank could be reduced sharply.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A method of making granulated slag which comprises:
    (a) contacting water with molten slag in an amount sufficient to cause breaking of said molten slag into solid particles, whereby said water is heated;
    (b) introducing said particles and said heated water into a container having a bottom wall and equipped with an overflow upwardly spaced from said bottom wall, whereby a major portion of said particles collects near said bottom wall,
        (1) the amount of said water being sufficient to cause a portion of the heated water to be released from said container through said overflow;
    (c) pumping the collected particles and the remainder of said heated water as a slurry out of said container to a sedimentation zone remote from said container; and
    (d) separating the particles from the water of said slurry in said zone.
2. a method as set forth in claim 1, wherein less than 10% by weight of said introduced particles are released from said container with said portion of the heated water.
3. A method as set forth in claim 2, wherein said portion of the heated water includes at least approximately one half of said heated water.
4. A method as set forth in claim 1, wherein said portion of the heated water is conveyed to said sedimentation zone and combined in said zone with the water of said slurry separated from said particles of said slurry.
5. A method as set forth in claim 4, wherein said portion is conveyed to said zone by gravity.
6. A method as set forth in claim 1, wherein water colder than said heated water is introduced into said container adjacent said bottom wall in an amount effective at least partly to replace said heated water in said slurry, the replaced heated water being released through said overflow.
7. A method as set forth in claim 6, wherein said colder water is introduced into said container at a rate sufficient to maintain a substantially constant water level in said container by continuous release of water through said overflow.

* * * * *